United States Patent [19]

Auberti Georges

[11] Patent Number: 4,674,152
[45] Date of Patent: Jun. 23, 1987

[54] DEPILATORY APPARATUS AND METHOD FOR DEPILATING SLAUGHTERED ANIMALS

[76] Inventor: Auberti Georges, Mas d Arvor, I3360 Roquevaire, France

[21] Appl. No.: 762,390

[22] Filed: Aug. 5, 1985

[30] Foreign Application Priority Data

Aug. 10, 1984 [FR] France ................................. 8412760
Oct. 17, 1984 [FR] France ................................. 8416009

[51] Int. Cl.⁴ .............................................. A22B 5/08
[52] U.S. Cl. .......................................... 17/47; 17/20; 17/11.1 R
[58] Field of Search ................. 19/47, 51, 1 D, 1 DA, 19/20; 17/11.1 R, 47, 1 E, 20; 30/34.2

[56] References Cited

U.S. PATENT DOCUMENTS

| | | | |
|---|---|---|---|
| 844,153 | 2/1907 | Loescher | 17/20 |
| 1,667,946 | 5/1928 | Olsen et al. | 17/20 |
| 2,978,738 | 4/1961 | Jönsson | 17/20 X |
| 3,045,345 | 7/1962 | Bermingham | 30/34.2 X |
| 3,316,633 | 5/1967 | Tapper | 30/34.2 |
| 3,472,499 | 10/1969 | Burch | 17/47 |
| 3,715,779 | 2/1973 | Snowden | 17/20 X |

FOREIGN PATENT DOCUMENTS 1507934 7/1969 Fed. Rep. of Germany .
1230589 9/1960 France .

*Primary Examiner*—Willie G. Abercrombie
*Attorney, Agent, or Firm*—Sandler & Greenblum

[57] ABSTRACT

An apparatus for removing hair from the skin of slaughtered animals including a chamber having a top, bottom and a dielectric lateral wall between the top and the bottom of the chamber which acts as a thermal barrier and defines an interior space for receiving an animal and is provided with at least one static electricity emitter positioned on the lateral wall of the chamber, a conduit for supplying combustible fluid to the chamber an ignitor for the combustible fluid, and a support for an animal extending transversely through the interior space of the chamber. A method for removing hair from the skin of a slaughtered animal by charging hair on the skin of slaughtered animals with electricity prior to burning the hair without damaging the skin of the animal which involves first positioning the skin of a slaughtered animal in a field of electrostatic force, exposing the hair on the skin of the animal to a combustible fluid, and igniting the combustible fluid to burn the hair on the skin on the animal so as to avoid damaging the skin of the animal.

24 Claims, 5 Drawing Figures

DEPILATORY APPARATUS AND METHOD FOR DEPILITATING SLAUGHTERED ANIMALS

BACKGROUND OF THE INVENTION

1. Field of the Invention

The present invention is directed to a depilatory apparatus, method for depilitating slaughtered animals, and a slaughter line incorporating a depilatory apparatus capable of removing hair from the skin of a slaughtered animals which does not require a preliminary scalding or boiling treatment. More specifically, the present invention is directed to an apparatus and method for depilitating slaughtered animals which involves charging the hair of slaughtered animals with electricity prior to burning the hair without damaging the skin.

2. Discussion of the Background and Material Information

In automated slaughter lines, for example used to process pigs, after the animal is slaughtered it is conveyed to a blood drainage station, to a washing station and then to a scalding station to prepare the skin of the animal for depilation and a singeing procedure to burn any residual hair remaining on the skin of the animal.

SUMMARY OF THE INVENTION

The object of the present invention is the provision of an apparatus which eliminates the need for scalding the skin of an animal prior to subjecting the skin of the animal to a depilatory procedure thereby making it possible to pass the slaughtered animal more directly to stations wherein evisceration of the animal is performed. The apparatus for the present invention includes a station in which hair is raised above the skin of the animal by static electricity and simultaneously burned using combustible fluids, such as alcohol, or plasma torches and the like.

BRIEF DESCRIPTION OF THE DRAWINGS

In the annexed drawings given by way of non-limiting example of one of the embodiments of the invention.

DETAILED DESCRIPTION

Figure 1:
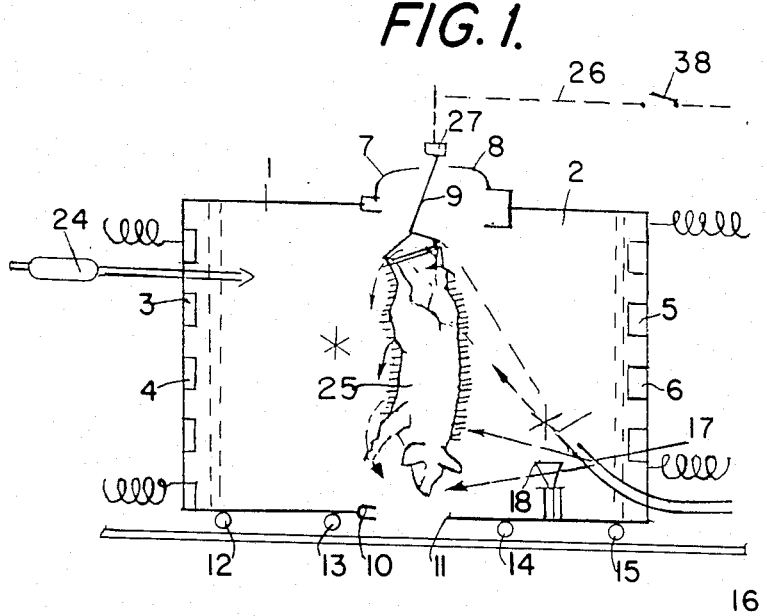
FIG. 1 is an elevational view in cross-section of the depilatory apparatus showing the electrostatic effect on the hair of a slaughtered animal.
Figure 2:
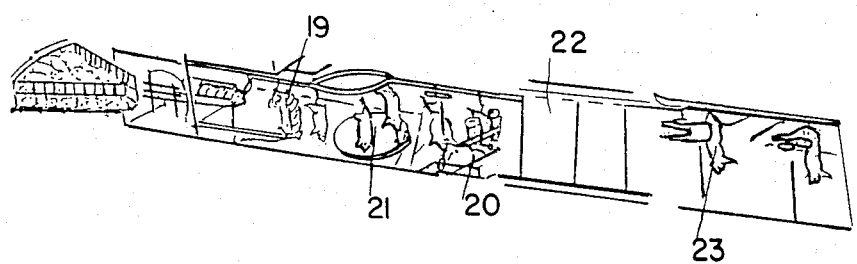
FIG. 2 is a perspective view of a slaughter assembly line incorporating the apparatus of the present invention.

Although the effects that static electricity has on hair is a known phenomenon, which often disturbs workers who are required to wear hair nets through which the hair protrudes when charged with static electricity, it is not believed that charging hair of slaughtered animals to cause the hair to extend away from the skin of the animal to improve depilitation by burning has been taught or suggested prior to the present invention.

The apparatus in accordance with the present invention includes a container or chamber having two elements or sections 1, 2 which are moveable towards and away from each other and can be brought together to define the interior space of the container. These sections may be provided both on their transverse walls, as well as on their longitudinal walls, with static electricity emitters 3, 4, 5, and 6 and may be sealed preliminary to burning using combustible fluid, such as plasma or gas, by means for sealing, identified as elements 7, 8, which surround the line or rail 9 and the lower and peripheral portions 10 and 11 of the sections of the container. Each of the sections are mounted on a roller 12, 13, 14, 15 which in turn are guided by rail 16. The containers are made of dielectric insulating material so that their walls form a thermal partition.

In one embodiment, combustible gas line 17 with ignitor 18 form a plasma arc porch which is located within the interior spaced defined by the two sections of the chamber. This arrangement makes it possible to pass substantial electric energy and bring the gas to a temperature as high as 4,000° F. in several hundredths of a second, although the volume of gas and the time period during which it is applied to the chamber is adjustable. The flame which results consumes essentially all of the skin hairs raised from the root of the hair follicle without damaging the skin of the animal.

The static electricity generators activated by the conductor gas have their effect increased by the fact that the rail sector 27 extending across station 20 may be isolated from the ground by means a circuit breaker 28. This particular arrangement permits carcass 25 to be either polarized or insulated and grounding the apparatus protects against accidental electrocution. In addition, a cold gas line 24 can be provided to supply coolant to the interior of the chamber so as to avoid any overheating.

In accordance with the present invention, the animal being processed may be passed directly from a bleeding station to the depilatory station 20. Alternatively, a washing station 21 and drying station 22 may be interposed between the bleeding station and the depilatory station. In either case, the carcass of the animal is passed directly from the depilatory station to the evisceration station 23.

The advantages of the rapid and effective thermal shock on the hair of the animals caused by the process of the present invention include a simplification of automated slaughter and evisceration lines of animals sold to butcher shops as a result of eliminating the need for boiling and/or scalding stations. Thus, the net cost of the meat product is lowered while at the same time producing rapid, hygenic and economic results and minimizing the risks of accidents caused by scalding. In addition, the apparatus of the invention allows for the total destruction and removal of the hair from the skin of an animal without leaving a trace of hair on the skin of the animal.

Figure 3:
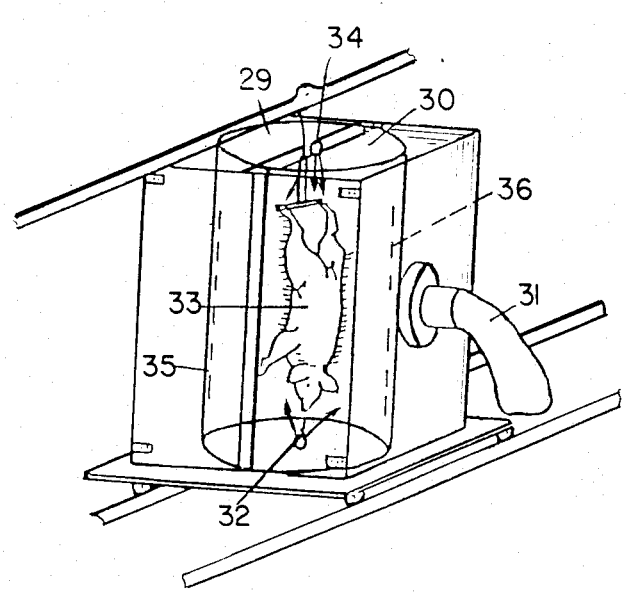
FIG. 3 is a perspective view showing the apparatus according to an embodiment of the present invention wherein alcohol is atomized into the chamber in which the animal is depilitated.
Figure 4:
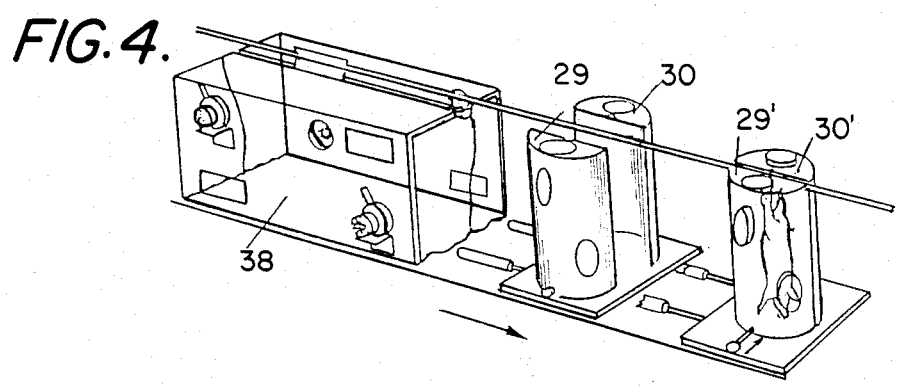
FIG. 4 is a perspective view of the apparatus of the present invention showing the chamber in which the animal is depilitated in an open and closed position located directly downstream from a druing station.
Figure 5:
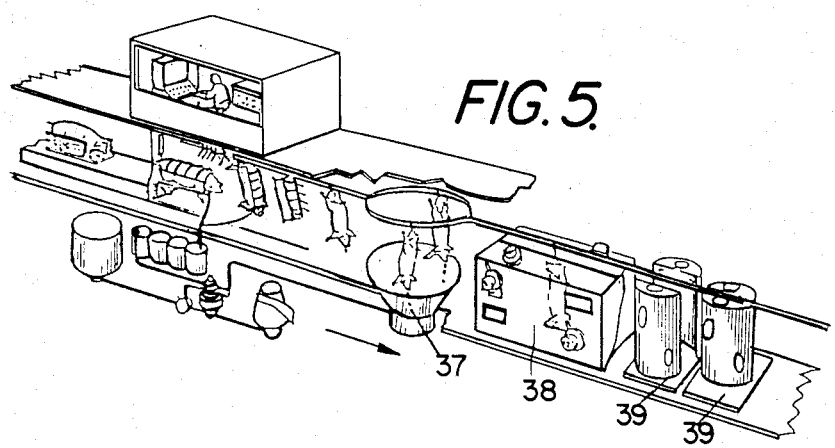
FIG. 5 is a perspective view of a portion of a slaughter line including the arrangement shown in FIG. 4 located directly downstream from a bleeding station.

In the embodiment shown in FIGS. 3, 4, 5, the chambers are provided with a high or low pressure atomizer for spraying combustible fluid, such as volatile alcohol, on the surface of the hairs which may then be ignited and caused to burn without forming a residue of the atomized alcohol and burnt hair on the skin of the animal.

As shown in FIG. 1, the chamber of the depilatory apparatus of the present invention is capable of being opened into two sections 29, 30 which, on the one hand, may be equipped with electrodes and an aspiration conduit, or on the other hand, may be provided with one or more projection nozzles 32 which may be positioned on the lower end portion of the chamber, for atomizing. As previously mentioned, the alcohol may be atomized using low or high pressure, but preferably low pressures, so that the atomized droplets are sprayed onto the carcass 33 without either splashing or explosions, and spread at the base at the raised hairs to saturate the entire surface of the hair. This atomization can occur at the upper portion 34, laterally, or over the entire interior surface of the chamber. In so doing, the carcass 33 may be polarized so that areas of the skin not directly subjected to the spray are nevertheless coated with the alcohol. In this regard, the skin hair acts as a wick and becomes saturated with the alcohol. Thus, the spark ignites the alcohol causing the hair to burn without leaving a residue of burnt alcohol and skin, or soiling of the skin of the animal which is ultimately cleaned merely by brushing or scraping. Alternately, the alcohol can be introduced simultaneously at the top and bottom 32, 34 of the chamber, as well as laterally along the walls of the chamber. In the latter instance, the ignition ramps 35, 36 are positioned to assure a rapid firing or ignition over the entire height of the carcass which is particularly advantageous when the alcohol is atomized under high pressure against the wall of the chamber causing a fog to form. The chamber is also provided with an exhaust so that after the burning, the suction 31 picks up all explosive, flammable gases, odors or other products of combustion.

Prior to treating in the depilatory chamber 29, 30, the carcass preferably undergoes a drying in a forced air stream at station 37, 38. As shown in FIGS. 3 and 4, chamber 29, 30 is in an open position.

In the embodiment of the present invention wherein the hair is burned using alcohol, one must operate the depilatory apparatus with the chambers 29, 30 in an open position whereas in the embodiment wherein the hair is burned using plasma, one must operate the chamber in a closed position 29', 30'. In either instance, the electrodes are brought to a high positive or negative voltage with respect to the carcass which is grounded by the rail to create an electric field where the electrostatic forces retain, attract and orient the skin hairs away from the skin in a direction which is perpendicular to the walls. The nozzles, likewise influenced by the magnetic field, atomize the alcohol solution which itself is subjected to an electrostatic pressure greater than the capillary pressure of the hair thereby resulting with a fog which is collected by the hairs on the skin of the animal. The insulating ambient air is thereby modified by the alcohol and causes a violent electrical discharge between the electrodes and the skin hair which destroys the skin hairs without leaving a residue as a result of the effect of heat resulting from the electrical discharge and the ozmotic saturation into the hair by virtue of the polarization of the hair fibers.

In accordance with the present invention, the slaughter line may be limited to three stations, i.e., the bleeding station 37, the drying station 38, and the depilatory treatment station 39, as shown in FIG. 4. However, the configurations, dimensions, arrangements of the various elements can vary within the limits of equivalences as well as the materials utilized for the manufacture without changing the general scope of the invention which has just been described.

From the foregoing description, one skilled in the art can easily ascertain the essential characteristics of this invention, and without departing from the scope thereof, can make various changes and modifications of the invention to adapt to various usages and conditions.

I claim:
1. An apparatus for removing hair from the skin of slaughtered animals comprising:
 (a) a chamber having a top, bottom and a dielectric lateral wall between said top and said bottom which act as a thermal barrier and define an interior space for receiving an animal, said chamber including:
  (i) at least one static electricity emitter positioned on said wall;
  (ii) means for supplying combustible fluid to said chamber in communication with a source of said combustible fluid;
  (iii) means for igniting said combustible fluid located within said interior space; and
  (iv) means for supporting said animal within said interior space extending transversely through said chamber.
2. The apparatus in accordance with claim 1, wherein said means for supporting is a rail adapted to be grounded.
3. The apparatus in accordance with claim 2, wherein said rail is insulated and is connected to a circuit breaker.
4. The apparatus in accordance with claim 1, wherein said combustible fluid is alcohol.
5. The apparatus in accordance with claim 4, wherein said means for supplying includes at least one atomizer.
6. The apparatus in accordance with claim 5, wherein at least one atomizer is located in an upper portion of said chamber.
7. The apparatus in accordance with claim 5, wherein at least one atomizer is located in a lower portion of said chamber.
8. The apparatus in accordance with claim 5, wherein at least one atomizer is located along said lateral wall.
9. The apparatus in accordance with claim 5, wherein said means for igniting includes at least one bank of lighters extending from an upper portion to a lower portion along said lateral wall of said chamber.
10. The apparatus in accordance with claim 1, wherein said combustible fluid is a gas.
11. The apparatus in accordance with claim 10, wherein said means for supplying and means for igniting form an arc torch.
12. The apparatus in accordance with claim 1, wherein said chamber includes:
 (v) an exhaust communicating with said interior space for discharging products of combustion from within said chamber.
13. The apparatus in accordance with claim 1, wherein said chamber includes:
 (a) means for cooling said interior space operably connected to said chamber.
14. The apparatus in accordance with claim 13, wherein said means for cooling is a conduit for supplying coolant to said interior space to prevent overheating of said chamber.
15. The apparatus in accordance with claim 1, wherein said chamber is composed of two separable sections each of which includes a portion of said top, a portion of said bottom, and a portion of said lateral wall adapted to be fitted together to form a seal between at least the top portions and the bottom portions of said chamber.

16. The apparatus in accordance with claim 15, wherein said bottom portions are provided with rollers for translating said sections towards and away from each other.

17. The apparatus in accordance with claim 16, wherein said rollers are guided by rails.

18. The apparatus in accordance with claim 1, comprising:
   a bleeding station located directly upstream from a drying station located directly upstream from said chamber.

19. A slaughter line consisting essentially of:
   (a) a slaughter station;
   (b) a bleeding station;
   (c) a drying station;
   (d) a depilatory station; and
   (e) an evisceration station,
wherein the depilatory station is a chamber equipped with at least one static electricity emitter, means for supplying combustible gas to said chamber and means for igniting said combustible gas within said chamber.

20. A method for removing hair from the skin of a slaughtered animal comprising:
   (a) charging hair on the skin of slaughtered animals with electricity and
   (b) burning said hair without damaging the skin of the animal.

21. A method for removing hair from the skin of a slaughtered animal comprising:
   (a) positioning the skin of a slaughtered animal in a field of electrostatic force;
   (b) exposing said hair to combustible fluid; and
   (c) igniting said combustible fluid to burn said hair in such a manner so as to avoiding damaging said skin.

22. The method in accordance with claim 21, wherein said combustible fluid is alcohol.

23. The method in accordance with claim 22, wherein said alcohol is atomized so as to completely cover said hair.

24. The method of claim 23, wherein said alcohol is electrostatically atomized to form a polarized fog which collects on said hair.

* * * * *